Sept. 14, 1965      C. O. SCHRADER      3,206,757

CARTRIDGE FOR MOTION PICTURE PROJECTOR

Original Filed April 3, 1961      7 Sheets-Sheet 1

INVENTOR.
CLARENCE O. SCHRADER
BY Lyon & Lyon
ATTORNEYS

Sept. 14, 1965          C. O. SCHRADER          3,206,757
CARTRIDGE FOR MOTION PICTURE PROJECTOR
Original Filed April 3, 1961                    7 Sheets-Sheet 2
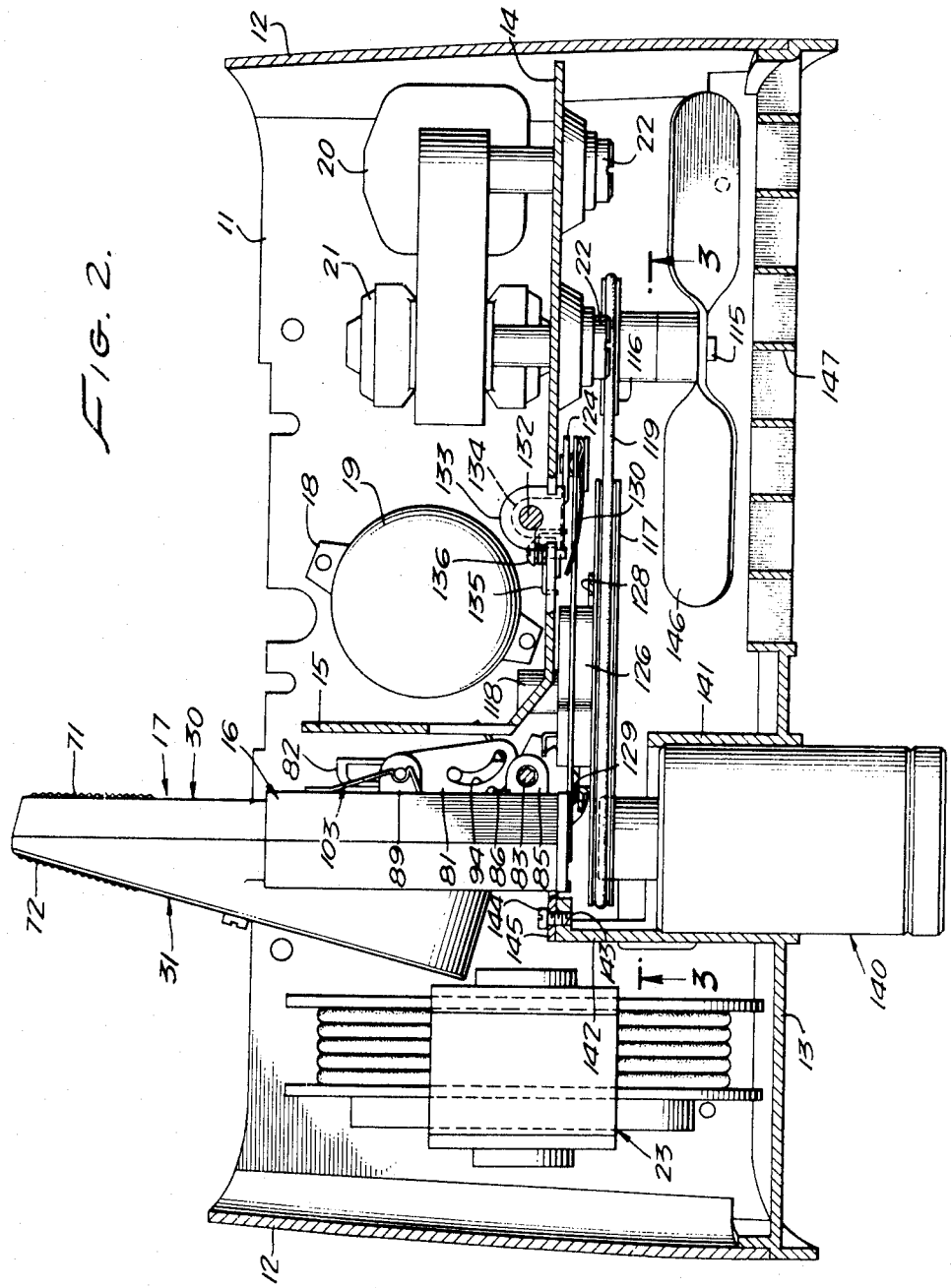
INVENTOR.
CLARENCE O. SCHRADER
BY
        Lyon & Lyon
              ATTORNEYS Sept. 14, 1965   C. O. SCHRADER   3,206,757
CARTRIDGE FOR MOTION PICTURE PROJECTOR
Original Filed April 3, 1961   7 Sheets-Sheet 3

INVENTOR.
CLARENCE O. SCHRADER
BY Lyon & Lyon
ATTORNEYS

Sept. 14, 1965         C. O. SCHRADER         3,206,757
CARTRIDGE FOR MOTION PICTURE PROJECTOR
Original Filed April 3, 1961                 7 Sheets-Sheet 4

INVENTOR.
CLARENCE O. SCHRADER
BY Lyon & Lyon
ATTORNEYS

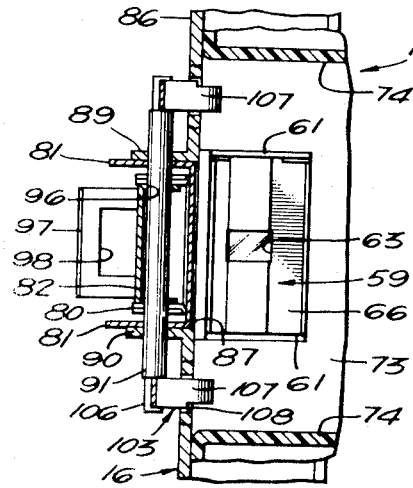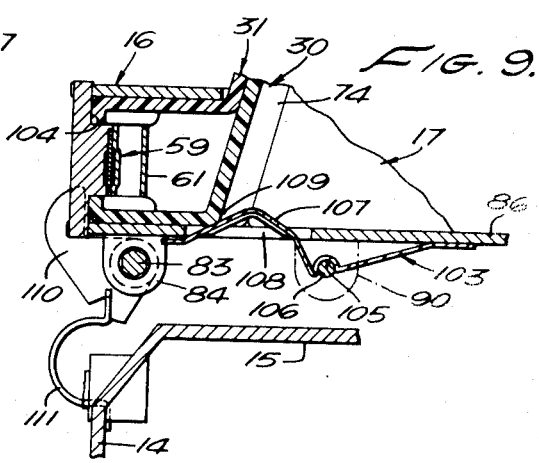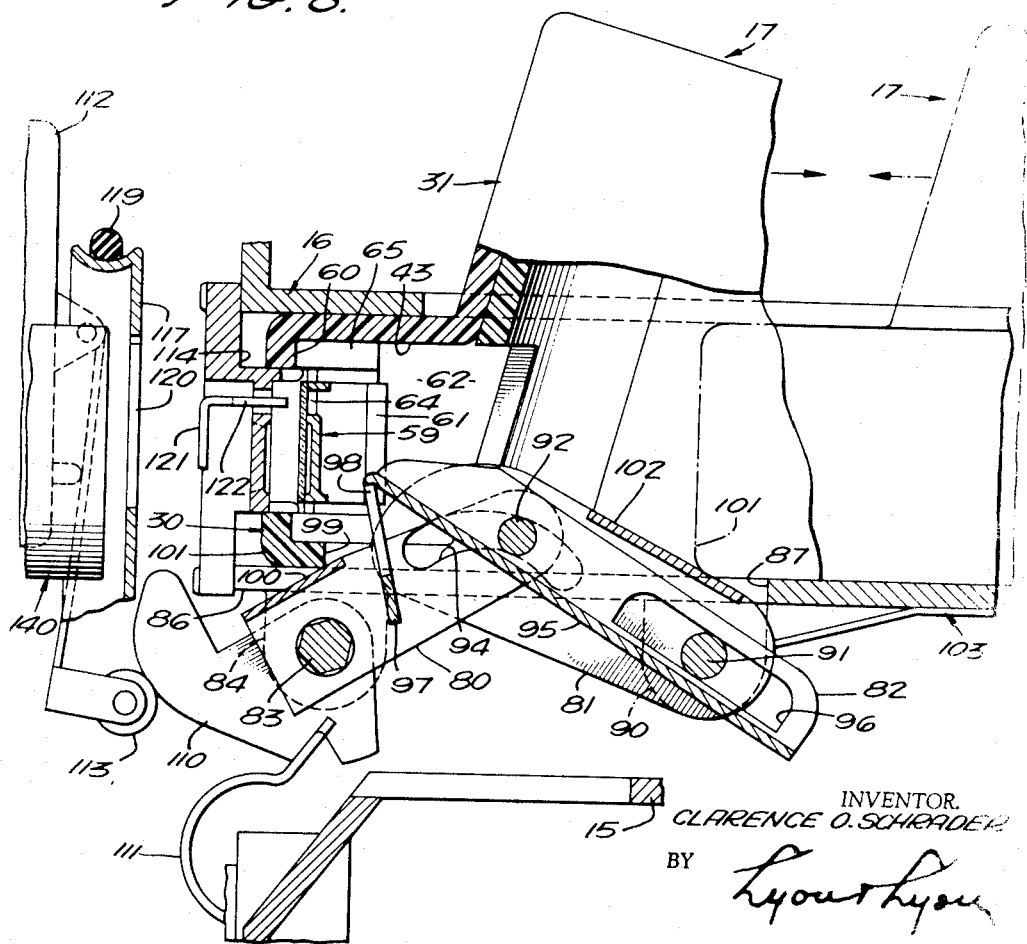

INVENTOR.
CLARENCE O. SCHRADER

Sept. 14, 1965 C. O. SCHRADER 3,206,757

CARTRIDGE FOR MOTION PICTURE PROJECTOR

Original Filed April 3, 1961 7 Sheets-Sheet 7

INVENTOR.
CLARENCE O. SCHRADER
BY
*Lyon & Lyon*
ATTORNEYS

United States Patent Office 3,206,757
Patented Sept. 14, 1965

3,206,757
CARTRIDGE FOR MOTION PICTURE PROJECTOR
Clarence O. Schrader, Sherman Oaks, Calif., assignor to Technicolor Corporation of America, Hollywood, Calif., a corporation of Maine
Original application Apr. 3, 1961, Ser. No. 100,358. Divided and this application Sept. 14, 1962, Ser. No. 230,022
13 Claims. (Cl. 352—78)

This is a division of application Serial No. 100,358, filed April 3, 1961.

This invention relates to a motion picture projector and film cartridge wherein the cartridge contains a continuous loop roll of film and the projector receives the cartridge for optically projecting the film.

The present common form of motion picture projector and in particular portable projectors for use with 8 or 16 mm. film, require a supply reel with the roll of film to be shown and a take-up reel on which the film is wound as it is being shown. The film must be threaded through various sprockets and aperture or pressure plates before the picture projection can be started. Further, after the complete roll of film has been shown, the end must be attached to the original reel and rewound thereon from the take-up reel.

Both the period of time required to thread the film through the projector and the time required to rewind the film on to the original roll may be objectionable or annoying in many situations. The threading of the film through the sprockets and plates requires a certain amount of skill and knowledge and therefore is not easily accomplished by one not familiar with movie projectors. As the use of motion picture film becomes more popular in the home, school and industry, it becomes important that the skill and knowledge required to operate projectors be minimized so as to permit their use by inexperienced persons.

Although there have been various motion picture projectors which use a cartridge containing the film, each of these projectors generally required that a loop film protrude from the cartridge and be threaded onto sprockets and through the aperture gate or that the cartridge contain a sprocket or spool to actively drive the film.

It is a common problem that operation of a projector by a relatively inexperienced operator often results in damage to the film due to the mishandling or improper threading of the film.

In accordance with the present invention there is provided a motion picture projector which entirely eliminates the need for threading and rewinding of the film and which is exceedingly simple to operate.

Accordingly, it is an object of this invention to provide a motion picture projector adapted to receive a cartridge containing an endless roll of movie film.

Another object of this invention is to provide such a projector in which the film may be inserted without any handling or threading thereof.

A further object of this invention is to provide a motion picture projector in which means are provided for optically projecting and advancing a roll of movie film contained in a cartridge removably inserted in the projector without requiring that any portion of the movie film extend externally of the cartridge before, after or during the projection of the film.

Another object of this invention is to provide a motion picture projector in which means are provided for removably receiving a cartridge containing a roll of film, wherein the cartridge may be inserted or extracted while the projector is running without damaging the moving film. Another object of this invention is to provide a novel motion picture film cartridge which contains an endless roll of film in which the means provided for rotatably supporting the roll of film do not actively engage the perforations of the film to accomplish the frame-by-frame advance of the film in the showing of the motion picture.

A further object of this invention is to provide a motion picture film cartridge containing a roll of film in which the inner surfaces of the cartridge have dielectric properties whereby movement of the film across those surfaces induces a static electric charge to attract and remove dust, dirt or lint from the surfaces of the film.

An additional object of this invention is to provide a motion picture film cartridge for an endless roll of film in which a single spool is provided for supporting the film and the means for advancing the movie film are entirely external to and not connected with the cartridge.

A more detailed object of this invention is to provide a motion picture projector and film cartridge for use therewith wherein all mechanically driven and moving parts are contained in the projector so that the cartridge is simple and inexpensive.

A further detailed object of this invention is to provide a motion picture projector film cartridge for use therewith in which in operation the film remains in the cartridge and means are provided in the projector for engaging the perforations of the film to advance the film frame by frame.

Other and additional objects and advantages of this invention will appear from the following description and the accompanying drawings.

In the drawings:

FIGURE 2 is a sectional plan view taken substantially on the line 2—2 of FIGURE 1.

FIGURE 8 is a fragmentary sectional elevational view taken substantially on the line 8—8 of FIGURE 4.

FIGURE 9 is a fragmentary sectional plan view taken substantially on the line 9—9 of FIGURE 4.

FIGURE 10 is an enlarged fragmentary sectional plan view similar to FIGURES 5 and 7 illustrating certain moving parts in a position different than shown in either FIGURES 5 and 7.

Figure 1:
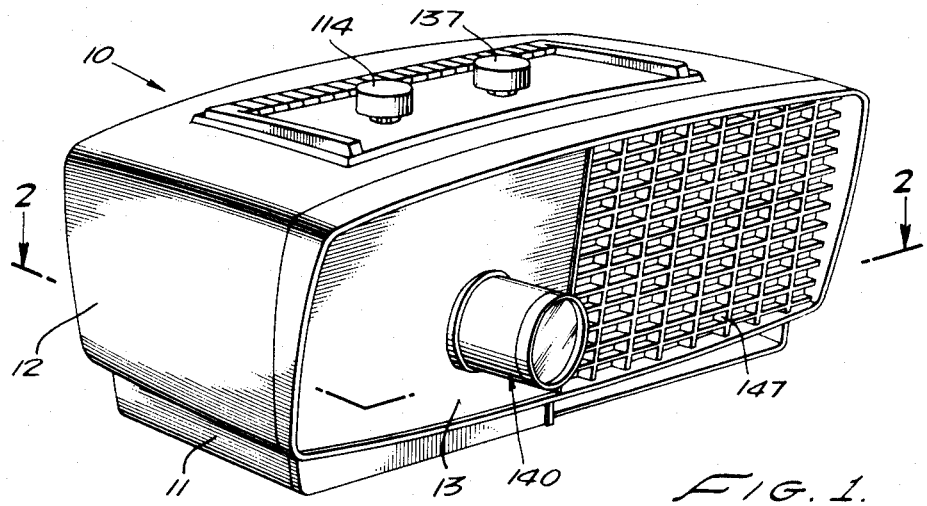
FIGURE 1 is a perspective view of the motion picture projector of this invention.

Referring now to the drawings, the motion picture projector housing generally designated 10 may include a base frame 11, a cover housing 12, front frame 13 and a back cover (not shown). A vertical support wall 14 may be integrally cast with the base frame 11 and have a lateral return wall 15 for added rigidity.

A socket assembly 16 is mounted on the base frame 11 by any convenient means such as integral pins 16a. The socket assembly 16 is provided for removably receiving the film cartridge generally designated 17. A suitable electric light bulb socket 18 is mounted on the base frame 11 for receiving an electric bulb 19 capable of producing sufficient light to optically project the motion picture image as hereinafter described. An electric motor 20 and speed reducer 21 are mounted on the support wall 14 by means of screws 22 for providing the power necessary to operate the moving parts of the projector. A cord reel 23 may be provided for conveniently storing the electric cord used for the projector.

As shown particularly in FIGURES 6, 7 and 11 through 17, the film cartridge 17 includes two non-identical housing halves 30 and 31 having various mating dowels and sockets 32 for positioning the halves relative to each other. A screw 33 passes through a hole 34 in half 31 and is threadedly received in the post portion 35 of housing half 30 for securing the two halves together. A spool 36 for supporting the roll of film is rotatably mounted on the external cylindrical surface 37 of the post 35. The housing halves 30 and 31 and the spool 36 are preferably cast or molded of a relatively non-conductive material, such as plastic. The parallel circular walls 38 and 39 of halves 31 and 30, respectively, form a generally cylindrical flat chamber 40 for captively retaining the spool 36 and roll of film 41, but is of adequate dimensions to permit rotation of the spool and film roll. The side walls 42 and 43 of halves 30 and 31 form a generally U-shaped chamber 44 extending from and communicating with the flat cylindrical chamber 40. The chamber 44 is provided for receiving the film loop 45 connecting the inner convolution 46 of the film roll to the outer convolution 47 of the film roll.

Figure 6:
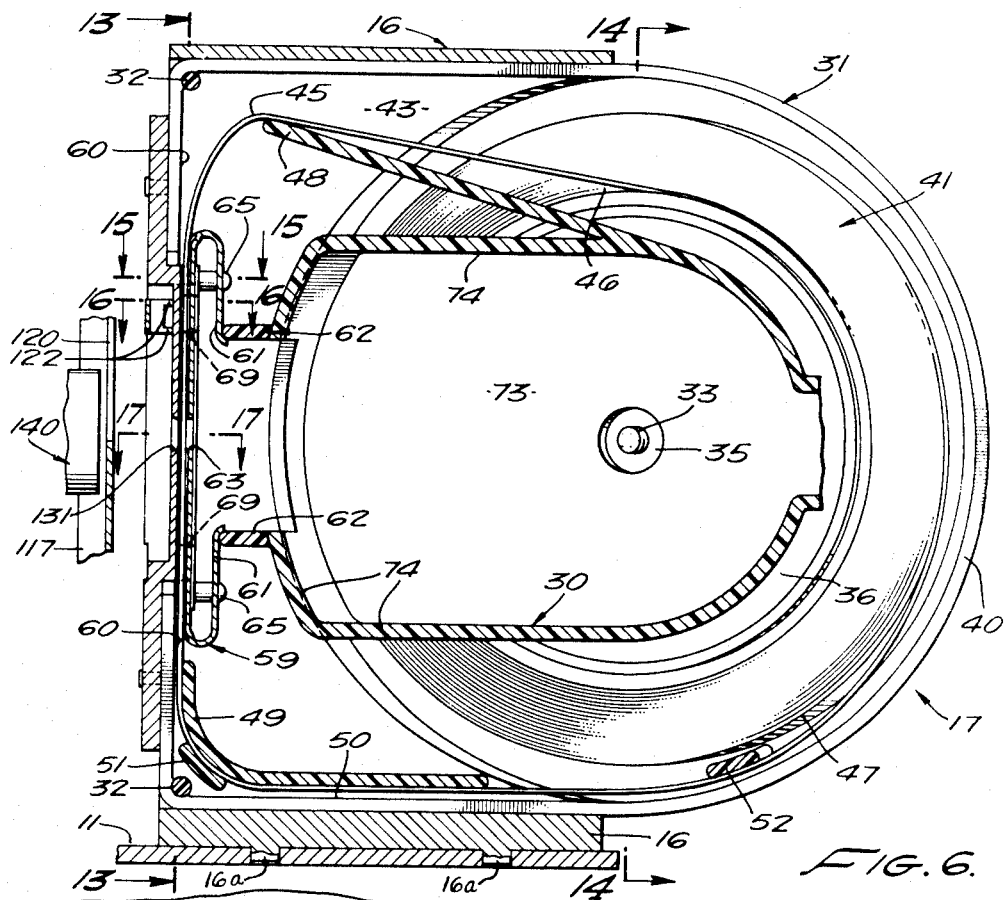
FIGURE 6 is a fragmentary elevational view of the film cartridge as taken substantially on the line 6—6 of FIGURE 5.

In order to feed the film past the light beam to optically project the image, as described below, the film is pulled from the inner convolution 46 of the continuous film roll 41 and rewound as the outer convolution 47 of the film roll. Since the motion picture film must move intermittently past the light beam frame by frame, a resilient finger 48 is integrally molded with housing half 30 for absorbing the inertial shock loading resulting from the intermittent turning of the film roll 41. The portion of the connecting loop 45 leading back to the outer convolution of the roll of film is confined between the guide 49 and post 51 and side wall 50 as best shown in FIGURE 6. The guide 49 and post 51 may be mounted or integrally formed on either half of the cartridge housing. An additional guide post 52 extends into both chambers 40 and 44 and is positioned at the particular point where the connecting loop 45 joins the outer convolution 47 of the film roll to prolong the separation of the loop 45 and the convolution 47 until after the edges 54 and 53 of the loop 45 and the convolution 47, respectively, have passed each other, thereby avoiding any catching of the edges. The film would be particularly susceptible to catching as described if either of the edges became cut or broken and obviously any spliced section would tend to catch at its edge.

The film-supporting surface of the spool 36 may be provided with a peripheral ridge 55 along one edge for supporting the perforated border portion 56 of the film, thus minimizing the wear to the picture portion of the film. The other edge of the spool may be provided with a cylindrical surface 57 of a smaller diameter than the ridge 55. A frusto-conical or tapered surface 58 extends between the ridge 55 and the cylindrical surface 57. The spool 36 is oriented relative to the housing halves 30 and 31 so that the ridge 55 is remove from the cylindrical surface 57 is adjacent to the chamber 44 provided for receiving the connecting loop 45. By providing this orientation and particular spool configuration, it can be seen that as the inner convolution 46 of the film roll is pulled off the roll into the chamber 44, it moves sideways relative to the spool, off the ridge 55, down the frusto-conical surface 58, momentarily on to the cylindrical surface 57, and thence into the chamber 44. If more than one convolution were to be pulled sideways off of the ridge 55 as the spool 36 and roll 41 continue to rotate, all of the convolutions except the one forming the connecting loop 45 would be urged by the wall 39 back up the frusto-conical surface 58 onto the ridge 55. Thus, it may be seen that the roll of film 41 may not become entangled as a result of more than one convolution being separated from the roll at one time.

An aperture plate 59 is mounted in the front portion of the chamber 44, the aperture plate 59 is urged forward toward the front wall 60 of the chamber 44 by leaf-springs 61 integrally formed with the aperture plate. The leaf-springs 61 are supported by the projections 62 integrally formed with the housing half 31 and extending into the chamber 44. When the cartridge is separate from the projector as in FIGURES 11 and 12, the aperture plate 59 is urged forward to press the film of the connecting loop 45 against the front wall 60 of the cartridge chamber 44, thereby maintaining the film roll 41 and the connecting loop 45 in the same position as when removed from the projector. The plate 59 is provided with an aperture 63 for permitting passage of the light necessary to optically project the film image frame by frame. This aperture 63 also tends to prevent excessive light from reaching the rest of the film loop 45 which could possibly result in excessive heating and damage. A slot 64 is provided also in the plate 59 for permitting an element to extend through the perforations of the film to engage and advance the film as hereinafter described. Ribs 65 are integrally formed with the cartridge to correctly position and locate the aperture plate 59. The aperture plate 59 is formed with a pair of longitudinal raised portions or ridges 66 forming a relieved portion 67 opposite the picture portion of the movie film to prevent the picture portion of the film from contacting the aperture plate 59.

Figure 17:
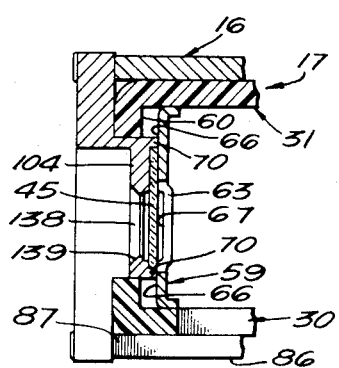
FIGURE 17 is a sectional plan view taken substantially on the line 17—17 of FIGURE 6.

In order to locate the film relative to the socket 16 and the rest of the projector, the aperture plate 59 is provided with cut-out portions 68 longitudinally spaced from the aperture 63 for receiving the protuberances 69 (shown in phantom lines in FIGURE 13) extending from the socket 16. The protuberances 69 engage either side of the aperture plate 59 at the cutout portions 68. The protuberances 69 are also laterally spaced to serve as a guide for the film loop 45. The socket 16 is also provided with ridges 70 (as shown in FIGURE 17) for engaging the outer surface of the aperture plate 59 as the cartridge 17 is inserted. These ridges urge the aperture plate back into the cartridge against the spring loading of the leaf-springs 61. By the interengagement of the aperture plate 59 with the protuberances 69 and the ridges 70 of the socket, the film is always correctly positioned relative to the socket 16 and the remaining elements of the projector.

Figure 12:
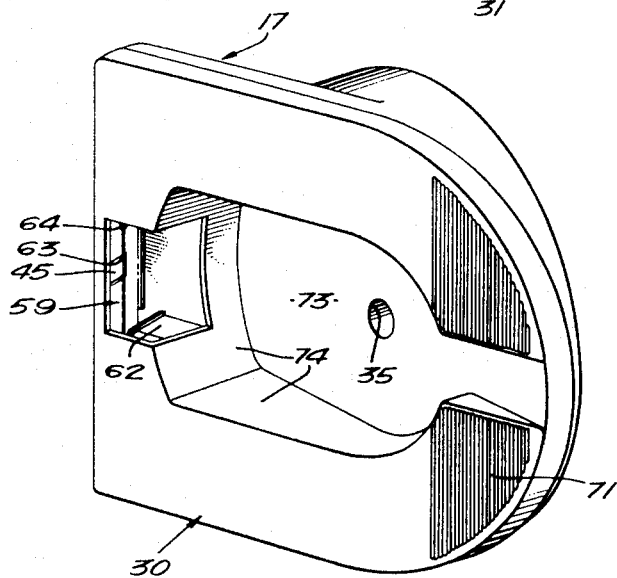
FIGURE 12 is a perspective view of a film cartridge showing the opposite side of the cartridge illustrated in FIGURE 11.
Figure 13:
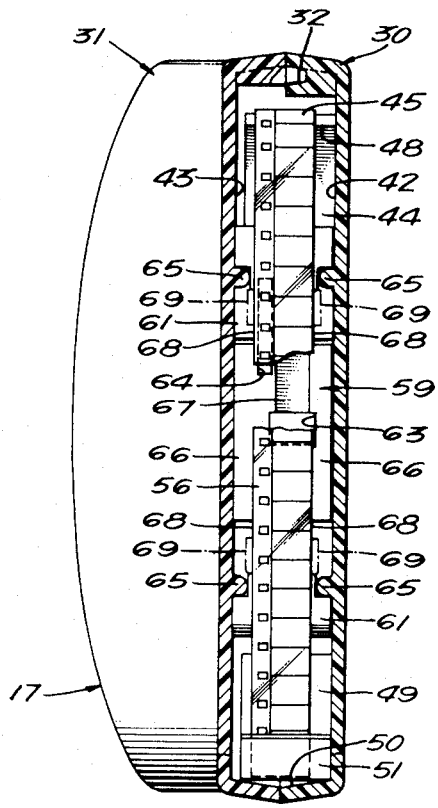
FIGURE 13 is a sectional elevational view of the front portion of the film cartridge as taken substantially on the line 13—13 of FIGURE 6.
Figure 14:
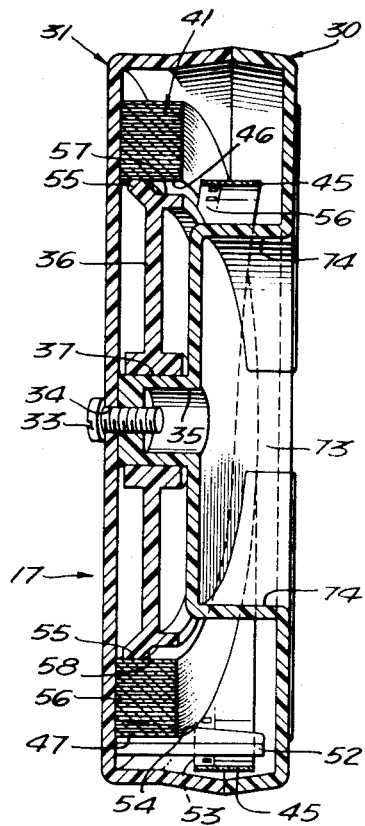
FIGURE 14 is a sectional elevational view of the film cartridge taken substantially on the line 14—14 of FIGURE 6.
Figure 15:
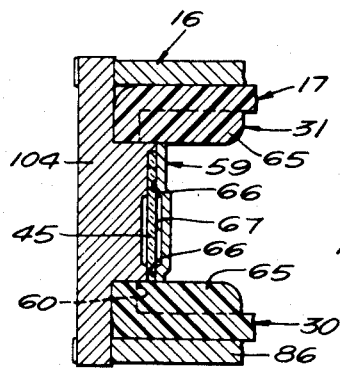
FIGURE 15 is a sectional plan view taken substantially on the line 15—15 of FIGURE 6.
Figure 16:
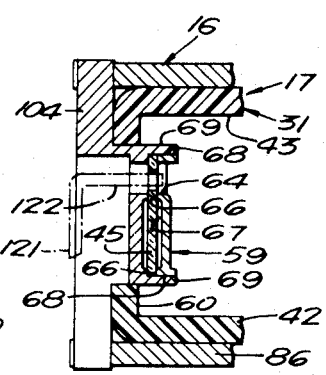
FIGURE 16 is a sectional plan view taken substantially on the line 16—16 of FIGURE 6.

The exterior of the cartridge 17 may be provided with serrations 71 and 72 on either side thereof for ease of gripping the cartridge when inserting or retracting from the socket 16. The housing half 30 has an external cavity 73 formed by the walls 74 which also serve to form the interior walls of the chamber 44. This cavity 73 opens to the rear of the aperture plate 59 as shown in FIGURE 12, and is provided for accommodating the light-reflecting means hereinafter described which are used to reflect the light from bulb 19 through the aperture 63 in the plate 59 and then through the frame of film to be projected.

In order to project the light emanating from the bulb 19 through the film while the cartridge is held in the socket 16, means are provided on the projector which may be positioned in the cartridge cavity 73 for reflecting the light from the bulb through the film. As shown in the drawings these means may include a reflecting element 82 and a pair of toggle elements 80 and 81 pivotally mounted on the socket 16, as hereinafter described. The toggles are mechanically interconnected and carry the reflecting element 82. A hexagonal shaft 83 is rotatably mounted in tabs 84 and 85 protruding from the side 86 of socket 16. An opening 87 is provided in the side 86 for accommodating the reflecting means. The toggle 80 has tabs 88 engaging the hexagonal shaft 83 to non-rotatably secure the toggle to the shaft. Tabs 89 and 90 protrude from the side 86 of the socket similar to tabs 84 and 85. The stub shaft 91 is rotatably mounted in tabs 89 and 90 parallel to the hexagonal shaft 83. Toggle 81 is mounted on the stub shaft 91 to permit turning about a vertical axis relative to the socket. A pin 92 is mounted on the toggle 80 and is retained thereon by washers 93. An arcuate slot 94 is formed in the toggle 81 for engaging the ends of the pin 92 so that movement of either toggle 80 or 81 causes the pin 92 to engage and move the other toggle 81 or 80, respectively. The reflecting element 82 has a reflecting surface 95 and is rotatably mounted on the pin 92. A pair of slots 96 in the reflecting element 82 are provided for slidably mounting the element on the stub shaft 91 thereby limiting the motion of the reflecting element 82 to rotation about the axis of pin 92 and rotation or transverse sliding relative to the axis of the stub shaft 91. A shield 97 is integrally formed with the reflecting element 82 and has an aperture 98 for permitting the light reflected from the surface 95 to pass through the aperture 98, through the aperture 63 in the cartridge plate 59, and then through the film. The shield 97 is provided to partially restrict the light reaching the aperture plate 59 and the film.

Movement of the reflecting means in and out of the cartridge cavity 73 is accomplished by moving either toggle 80 or 81 in or out of the cavity to cause similar movement of the interengaging reflecting element 82. Means are provided for retracting the reflecting means from the socket if the cartridge is inserted or removed from the socket while the reflecting means are in the position illustrated in FIGURE 7. This retracting of the reflecting means is accomplished as best illustrated in the enlarged fragmentary plan view, FIGURE 10, where it can be seen that if the cartridge 17 is retracted from the socket 16 with the reflecting means positioned in the cavity 73, the shoulder 99 of the cartridge engages the surface 100 of the toggle 80 causing clockwise rotation thereof as viewed in FIGURE 10. Due to the interengagement of the toggles 80 and 81 and the reflecting element 82, all three are retracted from the socket 16 as a result of this clockwise turning of toggle 80. If the reflecting means are positioned in the socket when the cartridge 17 is inserted, the front edge 101 of the cartridge engages the surface 102 of the toggle 81 as illustrated by the phantom lines in FIGURE 10 to cause counterclockwise rotation of toggle 81 thereby retracting the toggles 80 and 81 and the reflecting element 82 from the socket 16.

A generally U-shaped leaf-spring 103 is provided for resiliently holding the cartridge 17 in the socket 16 and biasing the cartridge toward and against the front wall 104 of the socket. Referring specifically to FIGURE 9, the leaf-spring 103 has a pair of pockets 105 formed therein for partially encircling the stud ends 106 of the shaft 91. A dog leg 107 of the spring 103 extends through apertures 108 in the side wall 86 of the socket 16 to engage the shoulder 109 of the cartridge 17 thereby urging the cartridge forward in the socket 16.

Figure 5:
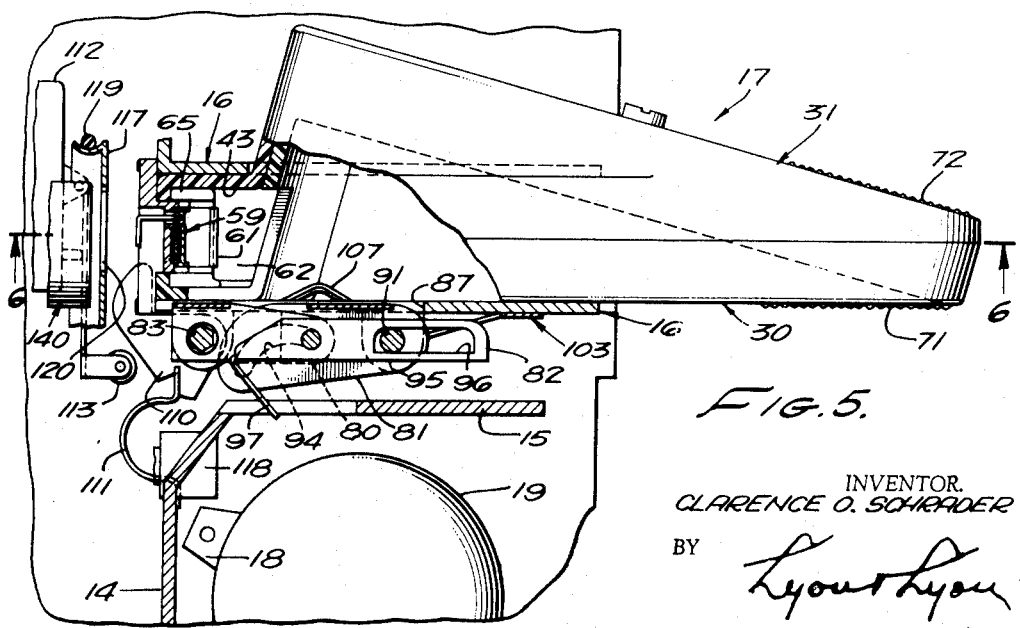
FIGURE 5 is a fragmentary plan view taken substantially on the line 5—5 as shown in FIGURE 4.
Figure 7:
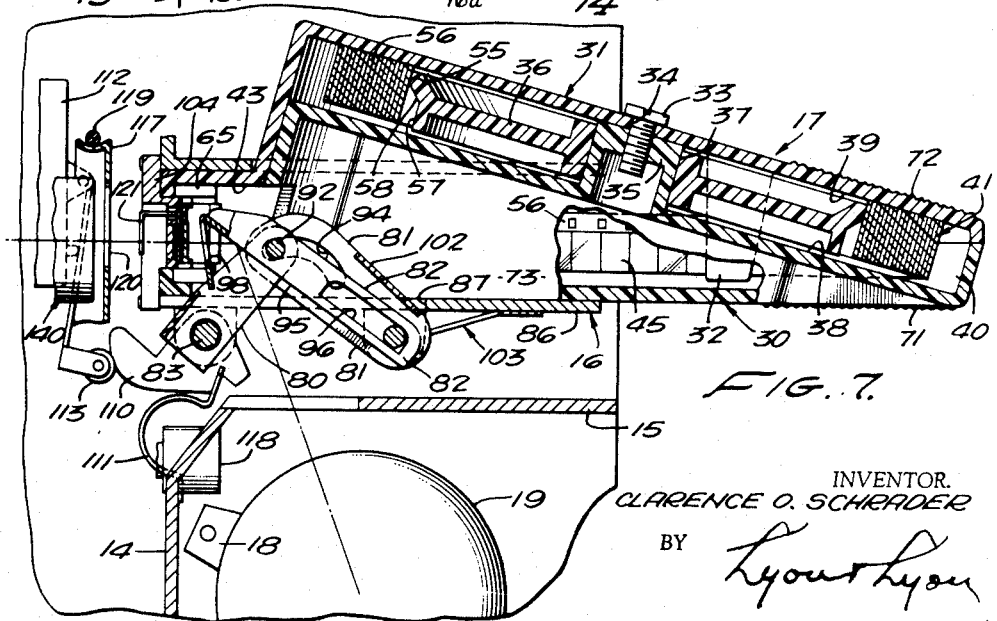
FIGURE 7 is a fragmentary sectional plan view similar to FIGURE 5 with some of the moving parts illustrated in a different position than as shown in FIGURE 5.
Figure 11:
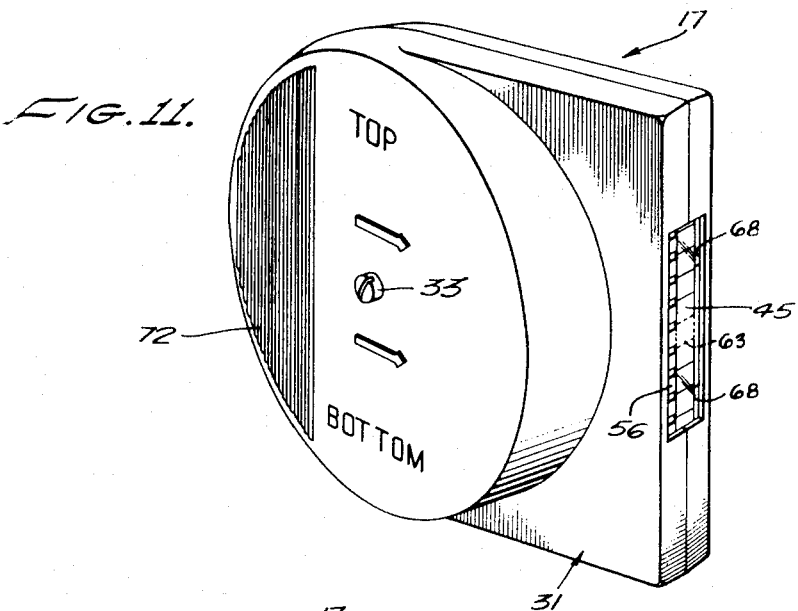
FIGURE 11 is a perspective view of one side of a film cartridge containing a roll of film.

A cam 110 is non-rotatably mounted on the shaft 83 and is biased in either direction by an over-center spring 111 extending from the support wall 14 to the cam so that the toggle 80 is biased to either an in or out position relative to the socket as illustrated in FIGURES 7 and 5, respectively. An electrical switch 112 having a cam follower 113 engaging the cam 110 is provided for turning the electric bulb 19 and electric motor 20 on and off. The on and off positions of the switch 112 are illustrated by FIGURES 7 and 5, respectively. The shaft 83 extends through the cover housing 12 and carries an on and off knob 114 for operating the electrical switch 112 and the reflecting means.

The electrical motor 20 drives the speed reducer 21 which has shaft 115 extending through the support wall 14 and carrying a pulley 116. A second and larger pulley 117 is rotatably mounted on shaft 118 secured to the support wall 14. The pulley 117 is driven by the pulley 116 through a rubber belt 119 engaging the peripheries of the two pulleys. The pulley 117 has three apertures 120 and is so positioned as to serve as a shutter for the light passing through the movie film.

Figure 3:
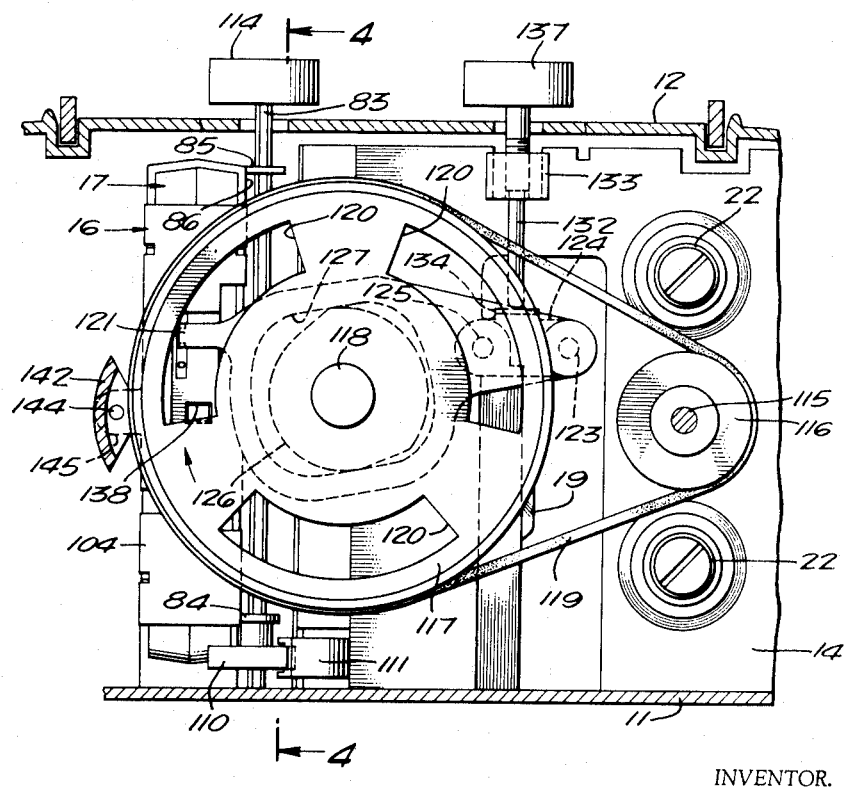
FIGURE 3 is a fragmentary sectional elevational view taken substantially on the line 3—3 of FIGURE 2
Figure 4:
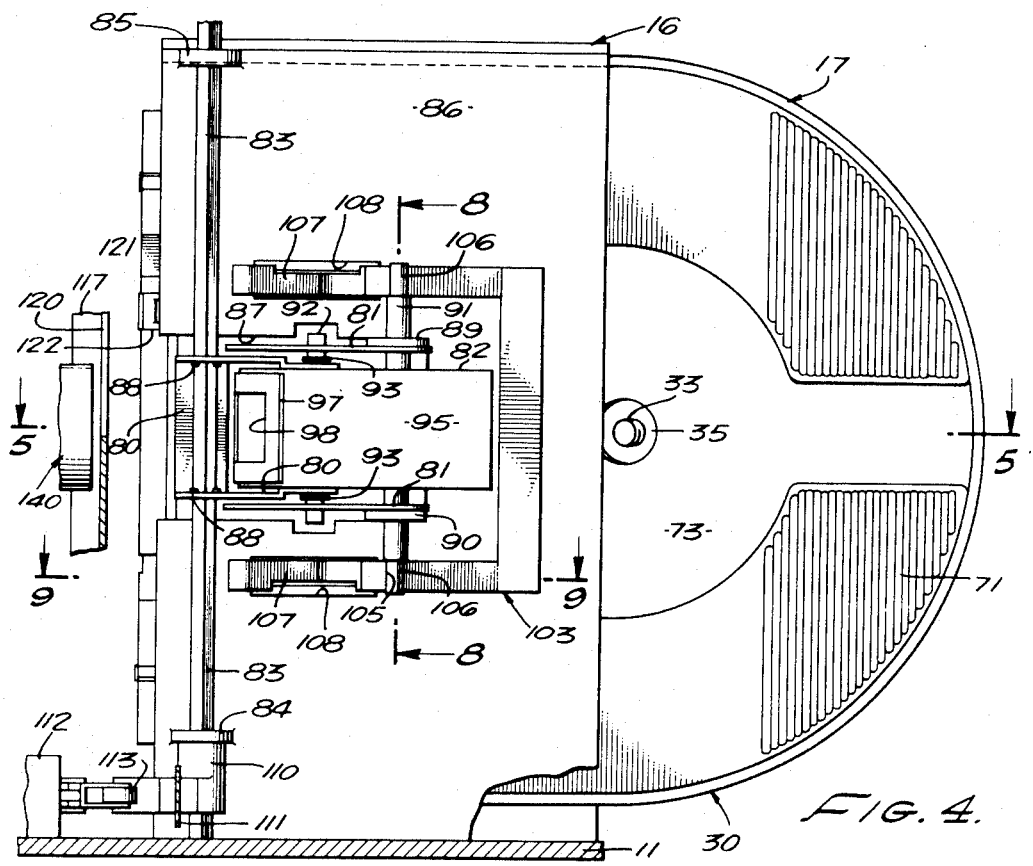
FIGURE 4 is a fragmentary sectional elevational view taken substantially on the line 4—4 of FIGURE 3.

In order to intermittently engage the perforations of the movie film to advance the film frame by frame as the motion picture is being optically projected a claw arm 121 is provided with protuberances 122 for insertion through the film perforations into the slot 64 of the cartridge aperture plate 59. The arm 121 is pivotally mounted at 123 on the link 124 which is in turn mounted at 125 to the support wall 14. A cam 126 is mounted on the back of the pulley 117 to engage the cam-following aperture 127 in the arm 121 to effectuate the up an down movement of the protuberances 122 upon rotation of the pulley 117 to cause the frame-by frame advancing of the movie film. A second cam 128 is secured to the back of the pulley 117 and engages the cam follower 129 on the arm 121 to effectuate the in and out movement of the protuberances 122 to engage the perforations of the movie film. A spring 130 is provided for urging the arm 121 and cam follower 129 against the cam surface 128 at all times. The cams 128 and 126 are so oriented that each revolution of the pulley 117 moves the arm 121 to insert the protuberances 122 in the film perforations near the top of slot 64, to pull downward advancing the film one frame while the socket aperture 138 is covered by the pulley 117 thereby preventing the optical projection of the movement of the film, to retract the protuberances 122 from the film perforations, and then to return the arm 121 to its uppermost position, as illustrated in FIGURE 3, to begin the cycle anew.

Means are provided for adjusting the pivot point 123 of the arm 121 to allow for framing of the movie film to optically project an individual frame rather than between frames. As shown in the drawings, these adjusting means may include a threaded screw 132 threadly received in the boss 133 attached to the support wall 14 and engaging a tab 134 on the link 124. A torsion spring 135 mounted on the pivot pin 136 (which serves as pivot 125) engages the support wall 14 and the link 124 to urge the latter upward and into engagement with the threaded screw 132. The screw 132 extends through the cover housing 12 and a knob 137 is provided on the exterior of the cover housing 12 to permit rotation of the screw 132 thereby causing upward or downward displacement of the pivot point 123 and the resultant displacement of the protuberances 122 relatives to the film.

In order to properly and consistently restrict the image being optically projected, a precisely machined aperture 138 having tapered sides 139 is provided in the front wall 104 of the socket 16. An optical magnifying and focusing lens assembly, generally designated 140, is mounted in the front frame 13 for magnifying and focusing the image to be projected. The lens assembly 140 is positioned within the bushing portion 141 of the front frame and is correctly positioned relative to the socket 16 and the aperture 138 therein by means of the extension 142 on the front frame having a threaded hole 143 for threadly receiving the screw 144 which extends through the boss 145 provided on the side of the socket 16.

In order to cool the electric bulb 19 and motor 20 a fan 146 may be secured to the shaft 15 to circulate air through the projector and out the grill opening 147 in the front frame 13.

From the foregoing it can be seen that all that is necessary to operate the projector is to insert the cartridge in socket 16 and turn the knob 114 to energize the motor and the light bulb. The film and consequently the picture can be stopped at any time during the projection by merely turning knob 114 to the off position thereby shutting off the electric bulb and motor. All possibility of injury to the movie film is eliminated and the cartridge can be pulled out of the projector socket 16 at any time even while the picture is being projected since the inter-engagement of the cartridge with the reflecting means, while the cartridge is being removed, causes the motor and electric bulb to be turned off.

The cartridge of this invention is completely passive, that is, it has no driving parts for progressively moving the movie film but rather the driving means are part of the projector and engage the film directly. Further, the movie film is retained within the cartridge at all times to minimize the possibility of damage from handling. The storage space required for the cartridge is minimized by the configuration of the housing and the fact that only a single spool is provided for supporting the film. This arrangement results in a cartridge which is only slightly larger than a conventional reel containing the same amount of movie film. By completely enclosing the film in the cartridge, the problem of dust or dirt accumulating and thereby damaging the film as well as intefering with the optical projection thereof is minimized, if not virtually eliminated.

The movement of the film against inner surfaces of the cartridge housing as the motion picture is being projected causes a static electric charge to be induced on the inner surfaces of the cartridge due to the difference in the dielectric constants of the film and the cartridge. This electric charge attracts any dust or dirt which may be present within the cartridge thereby keeping the movie film relatively free of dust, dirt and lint.

Having fully described my invention, it is to be understood that I do not wish to be limited to the details herein set forth or to the details illustrated in the drawings, but my invention is of the full scope of the appended claims.

I claim:

1. In a film cartridge for use in a motion picture projector having a cartridge-receiving socket and an illuminating means extending into the socket, the combination of: a housing, a spool rotatably mounted in said housing for supporting an endless roll of film, said spool having a film supporting surface combining a ridge for slidably engaging the border portion of said film and a smaller diameter cylindrical portion connected by a tapered surface, said housing having a chamber angularly protruding on the side of said housing remote from the said ridge of said spool for receiving the film loop connecting the inner and outer convolutions of the roll, said chamber having an aperture in which a frame of film is positioned for projecting, said housing having an external cavity adjacent said chamber for accommodating said illuminating means.

2. In a film cartridge for use in a motion picture projector having a cartridge-receiving socket and an illuminating means extending into the socket, the combination of: a housing, a spool rotatably mounted in said housing for supporting an endless roll of film, said spool having a peripheral ridge along one edge for supporting the perforated border of said film, said housing having a chamber protruding on the side of said housing remote from the peripheral ridge of said spool for receiving the film loop connecting the inner and outer convolutions of the roll, said chamber having an aperture in which a frame of film is positioned for projecting, and said housing having an external cavity adjacent said chamber for accommodating said illuminating means.

3. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a peripheral ridge along one edge for supporting the perforated portion of the film, a cylindrical surface of smaller diameter than said ridge adjacent the outer edge, and also a frusto-conical surface extending between said ridge and said cylindrical surface, and a second integral chamber in said housing communicating with said cylindrical chamber and protruding angularly therefrom for receiving the film loop connecting the inner and outer convolutions of said endless roll, said second chamber being adjacent the edge of said spool having the cylindrical surface, said second chamber having interior walls forming a cavity in the external surface of said housing for accommodating the said illuminating means.

4. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for slidably engaging the perforated portion of the film, a cylindrical surface of smaller diameter than said ridge adjacent the other edge, and also a frusto-conical surface extending between said ridge and said cylindrical surface, a second chamber in said housing extending angularly from and communicating with said cylindrical chamber for receiving the film loop connecting the inner and outer convolutions of said endless roll, said second chamber being adjacent the edge of said spool having a cylindrical surface, said second chamber having a front wall remote from said first chamber and interior walls forming a cavity in the external surface of said housing for accommodating the said illuminating means, and an aperture plate mounted in said second chamber between said cavity and said front wall, said connecting loop of film passing between said plate and said front wall, said second chamber having openings adjacent said aperture plate for permitting light to pass through said film for optical projection.

5. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for engaging the perforated portion of the film, a cylindrical surface of smaller diameter than said ridge adjacent the other edge, and also a frusto-conical surface extending between said ridge and said cylindrical surface, an integral second chamber in said housing communicating with said cylindrical chamber and extending at a small angle therefrom for receiving the film loop connecting the inner and outer convolution of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, and biasing means in said second chamber urging said plate toward said front wall.

6. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for engaging the perforated portion of the film, a cylindrical surface of smaller diameter than said ridge adjacent the other edge, and also a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, and biasing means in said second chamber urging said plate toward said front wall, said plate having a longitudinal slot for accommodating the projector member provided for protruding into and engaging the film perforations.

7. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for engaging the perforated portion of the film, a cylindrical surface of smaller diameter than said ridge adjacent the other edge, and also a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, said plate having a longitudinal slot for accommodating the projector member provided for protruding into and engaging the film perforations, and a pair of longitudinal ridges on the surface of said plate adjacent the said front wall for slidably engaging the borders of said film.

8. In a film cartridge for use in a motion picture projector having a cartridge-receiving socket, an illuminating means extending into the socket, and a member for protruding into the socket and engaging the film perforations to move the film past the light source or reflecting means, the combination of: a housing having a generally cylindrical flat chamber, a spool rotatably mounted in said chamber for supporting an endless roll of film, said spool having a film supporting surface comprised of a radially extending ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said light source of reflecting means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, said plate having a longitudinal slot for accommodating the projector member provided for protruding into and engaging the film perforations, a pair of longitudinal ridges on the surface of said plate adjacent the said front wall for slidably engaging the borders of said film, a second biasing means in said second chamber for slidably engaging the film extending from the inner convolution of the roll to the aperture plate for resiliently absorbing the shock caused by the intermittent movement of the film at the aperture plate by the pulling motion of the projector member intermittently engaging the film perforations and advancing the film frame by frame.

9. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, said plate having a longitudinal slot for accommodating the projector member provided for protruding into and engaging the film perforations, a pair of longitudinal ridges on the surface of said plate adjacent the said front wall for slidably engaging the borders of said film, second biasing means in said second chamber for slidably engaging the film extending from the inner convolution of the roll to the aperture plate for resiliently absorbing the shock caused by the intermittent movement of the film at the aperture plate by the pulling motion of the projector member intermittently engaging the film perforations and advancing the film frame by frame, and guide means in said second chamber for receiving the film extending from the aperture plate to the outer convolution of the roll for guiding the rewinding on the roll after exposure at the aperture plate.

10. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, said plate having a longitudinal slot for accommodating the projector member provided for protruding into and engaging the film perforations, a pair of longitudinal ridges on the surface of said plate adjacent the said front wall for slidably engaging the borders of said film, second biasing means in said second chamber for slidably engaging the film extending from the inner convolution of the roll to the aperture plate for resiliently absorbing the shock caused by the intermittent movement of the film at the aperture plate by the pulling motion of the projector member intermittently engaging the film perforations and advancing the film frame by frame, guide means in said second chamber for receiving the film extending from the aperture plate to the outer convolution of the roll for guiding the rewinding on the roll after exposure at the aperture plate, said guide means including an element positioned between the outer convolution of the roll and the connecting loop adjacent their juncture whereby the interengagement or catching of the film edges is prevented.

11. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for suporting an endless roll of film, said spool having a film supporting surface comprised of a radially extending peripheral ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, and second biasing means in said second chamber for slidably engaging the film extending from the inner convolution of the roll to the aperture plate for resiliently absorbing the shock caused by the intermittent movement of the film at the aperture plate by the pulling motion of the projector member intermittingly engaging the film perforations and advancing the film frame by frame, guide means in said second chamber for receiving the film extending from the aperture plate to the outer convolution of the roll for the guiding the rewinding on the roll after exposure at the aperture plate.

12. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, second biasing means in said second chamber for slidably engaging the film extending from the inner convolution of the roll to the aperture plate for resiliently absorbing the shock caused by the intermittent movement of the film at the aperture plate by the pulling motion of the projector member intermittently engaging the film perforations and advancing the film frame by frame, and guide means in said second chamber for receiving the film extending from the aperture plate to the outer convolution of the roll for guiding the rewinding on the roll after exposure of the aperture plate, said guide means including an element positioned between the outer convolution of the roll and the connecting loop adjacent their juncture whereby the interengagement of catching of the film edges is prevented, the flat sides of said first chamber being so spaced as to constrain the film in a single roll.

13. In a film cartridge for use in a motion picture projector having a cartridge-receiving socket, an illuminating means extending into the socket, and a member for protruding into the socket and engaging the film perforations to move the film past the illuminating means, the combination of: a housing having a generally cylindrical flat chamber, a spool rotatably mounted in said chamber for supporting an endless roll of film, said spool having a film supporting surface comprised of a radially extending peripheral ridge adjacent one edge for engaging the perforated portion of the film, a cylindrical surface of smaller diameter than said ridge adjacent the other edge, and a frusto-conical surface extending between said ridge and said cylindrical surface, a second chamber in said housing communicating with and extending angularly from said cylindrical chamber for receiving the film loop connecting the inner and outer convolutions of said endless roll, said second chamber being adjacent the edge of said spool having the cylindrical surface, said second chamber having a front wall remote from said first chamber and interior walls forming a cavity in the external surface of said housing for accommodating the said illuminating means, an aperture plate mounted in said second chamber between said cavity and said front wall, said connecting loop of film passing between said plate and said front wall, said second chamber having openings adjacent said aperture plate for permitting light to pass through said film for optical projection, biasing means in said second chamber urging said plate toward said front wall, said plate having a longitudinal slot for accommodating the projector member provided for protruding into and engaging the film perforations, second biasing means in said second chamber for slidably engaging the film extending from the inner convolution of the roll to the aperture plate for resiliently absorbing the shock caused by the intermittent movement of the film at the aperture plate by the pulling motion of the projector member intermittently engaging the film perforations and advancing the film frame by frame, and guide means in said second chamber for receiving the film extending from the aperture plate to the outer convolution of the roll for guiding the rewinding on the roll after exposure of the aperture plate, said guide means including an element positioned between the outer convolution of the roll and the connecting loop adjacent their juncture whereby the interengagement or catching of the film edges is prevented.

References Cited by the Examiner

UNITED STATES PATENTS

| | | | |
|---|---|---|---|
| 1,206,357 | 11/16 | Nusbaum. | |
| 1,431,512 | 10/22 | Clark | 242—55.18 |
| 2,039,108 | 4/36 | Owens | 179—100.3 |
| 2,464,965 | 3/49 | Chemel | 242—55.19 |
| 2,670,202 | 2/54 | Gregg | 242—55.18 |

FOREIGN PATENTS 406,868   3/34   Great Britain.

JULIA E. COINER, *Primary Examiner.*